United States Patent
Ferrell, Jr. et al.

(10) Patent No.: US 11,685,217 B1
(45) Date of Patent: Jun. 27, 2023

(54) PNEUMATIC AUTOMOTIVE HEIGHT ADJUSTER ASSEMBLY

(71) Applicant: J. Ferrell Custom Trucks LLC, Gap, PA (US)

(72) Inventors: James J. Ferrell, Jr., Gap, PA (US); Collen J. Ferrell, Gap, PA (US)

(73) Assignee: J. Ferrell Custom Trucks LLC, Gap, PA (US)

( * ) Notice: Subject to any disclaimer, the term of this patent is extended or adjusted under 35 U.S.C. 154(b) by 0 days.

(21) Appl. No.: 18/110,410

(22) Filed: Feb. 16, 2023

Related U.S. Application Data

(60) Provisional application No. 63/328,388, filed on Apr. 7, 2022.

(51) Int. Cl.
  *B60G 11/27* (2006.01)
  *B60G 17/052* (2006.01)
  *B60G 17/015* (2006.01)
(52) U.S. Cl.
  CPC ..... *B60G 17/0525* (2013.01); *B60G 17/0155* (2013.01); *B60G 2202/152* (2013.01)
(58) Field of Classification Search
  CPC ............ B60G 17/0155; B60G 17/0525; B60G 2202/152
  USPC ................ 280/5.513, 5.514, 124.1–124.161; 267/64.16, 64.19, 64.21
  See application file for complete search history.

(56) References Cited

U.S. PATENT DOCUMENTS

| | | | | |
|---|---|---|---|---|
| 7,380,799 B2 * | 6/2008 | Niaura | ................... | B60G 15/14 280/124.159 |
| 10,479,159 B2 * | 11/2019 | Gandhi | .............. | B60G 17/0155 |
| 11,497,164 B2 * | 11/2022 | Martin | ................. | A01B 63/002 |
| 2006/0267296 A1 * | 11/2006 | Dodd | ............... | B60G 17/01908 280/124.157 |

\* cited by examiner

*Primary Examiner* — Christopher P Schwartz
(74) *Attorney, Agent, or Firm* — Joseph E. Maenner; Maenner & Associates, LLC

(57) ABSTRACT

A pneumatic automotive height adjuster assembly provides at least one bag removably connected to a vehicle having a frame. The at least one bag is configured to adjust a height of the frame. An air supply line has a supply end and a discharge end. The discharge end is in fluid communication with each of the at least one bag. The air supply is configured to provide air to inflate the at least one bag. A switch is in fluid communication with the supply end of the air supply line. The switch has a first discharge, a second discharge, and a switch input. A leveling valve is in fluid communication with the first discharge. The air supply line is in fluid communication with the second discharge. An air supply is in fluid communication with the leveling valve and the switch input.

20 Claims, 6 Drawing Sheets

PNEUMATIC AUTOMOTIVE HEIGHT ADJUSTER ASSEMBLY

CROSS-REFERENCE TO RELATED APPLICATION

The present application claims the benefit of U.S. Provisional Patent Application Ser. No. 63/328,388, filed on Apr. 7, 2022, which is incorporated by reference herein in its entirety.

BACKGROUND OF THE INVENTION

Field of the Invention

The invention relates to a pneumatic height adjuster assembly to adjust the height of a truck chassis or other part of a vehicle to alter the truck's or vehicle's appearance.

Description of the Related Art

It is known to add pneumatic systems to vehicles and vehicle cabs to raise the chassis above the frame of the vehicle.

It would be beneficial to provide a pneumatic height adjuster that can inflate air bags a first amount to lift a truck chassis a desired height and also to over-inflate the air bags to lift the truck chassis above the desired height, such as for off-road travel.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a pneumatic automotive height adjuster assembly. The assembly provides at least one bag removably connected to a vehicle having a frame. The at least one bag is configured to adjust a height of the frame. An air supply line has a supply end and a discharge end. The discharge end is in fluid communication with each of the at least one bag. The air supply is configured to provide air to inflate the at least one bag. A switch is in fluid communication with the supply end of the air supply line. The switch has a first discharge, a second discharge, and a switch input. A leveling valve is in fluid communication with the first discharge. The air supply line is in fluid communication with the second discharge. An air supply is in fluid communication with the leveling valve and the switch input.

In another embodiment, the present invention is a pneumatic automotive height adjuster assembly comprising an air supply and a switch in fluid communication with the air supply. The switch has an air input, a first discharge port, and a second discharge port. A pilot valve has an input in fluid communication with the first discharge port, a first output, and a second output. A leveling valve is in fluid communication with the first output and an airbag is in fluid communication with the second output.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1A:
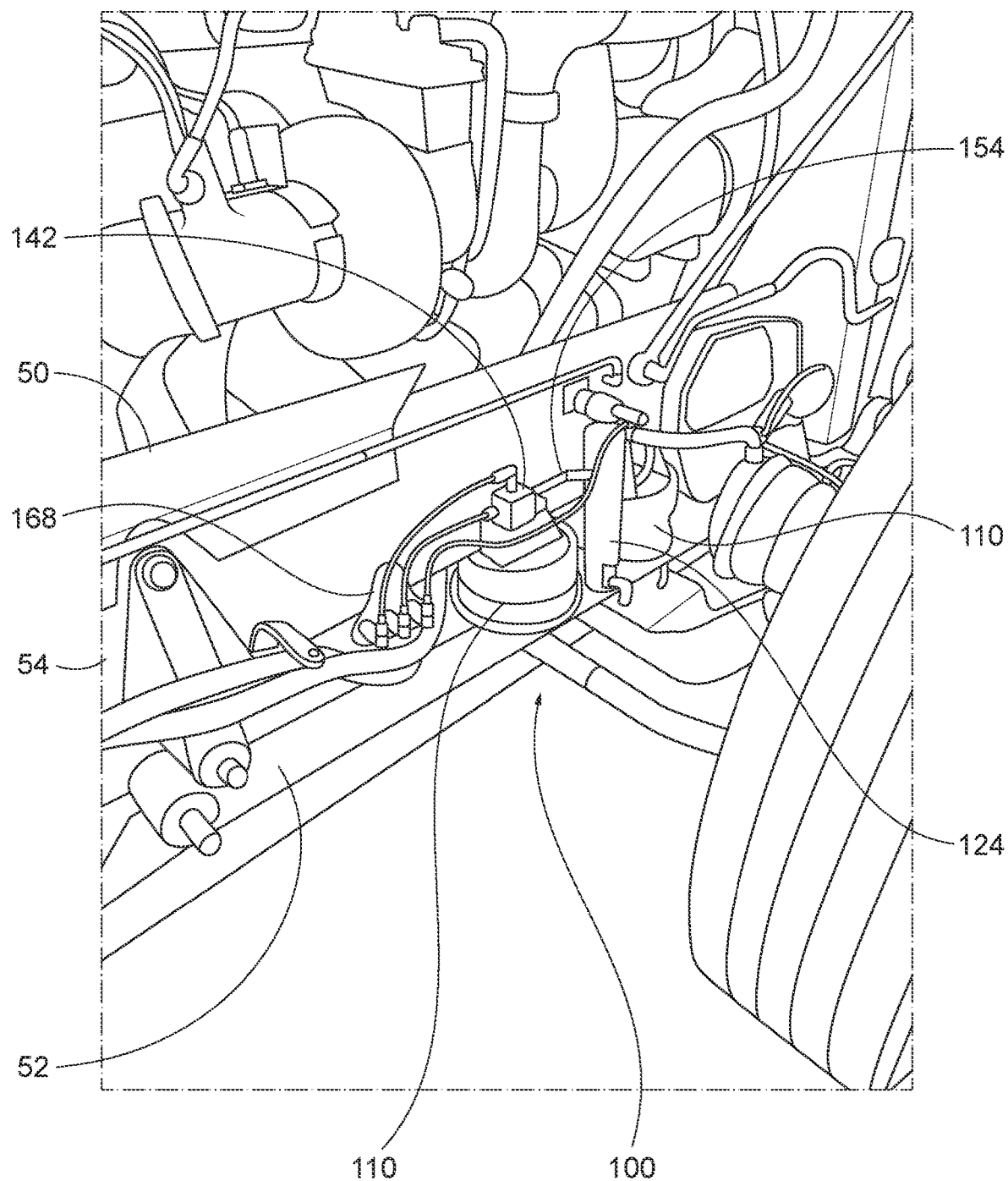
FIG. 1A is a perspective view of a pneumatic automotive height adjuster assembly according to an exemplary embodiment of the present invention.
Figure 1B:
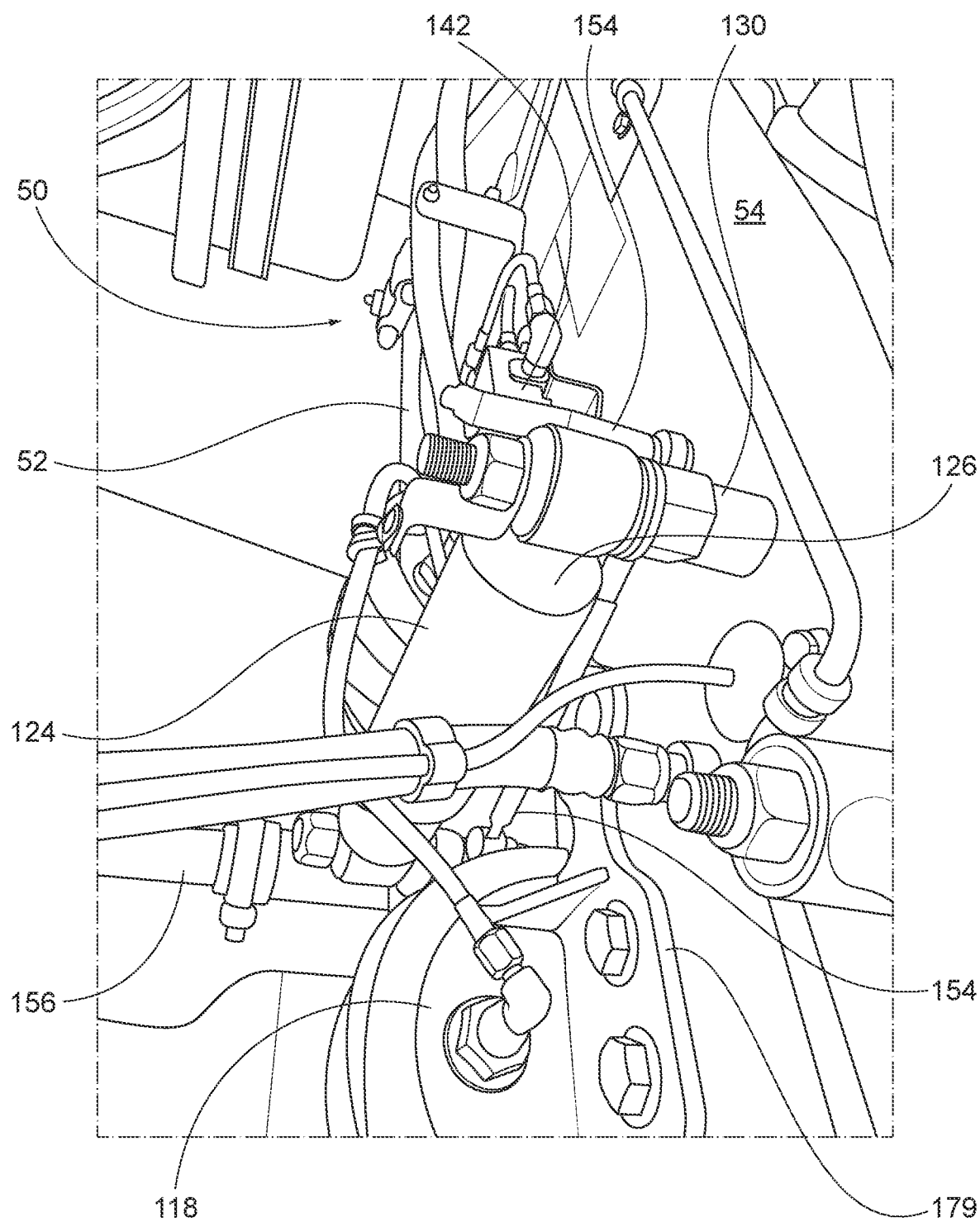
FIG. 1B is another perspective view of the assembly of FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

The present invention is a pneumatic automotive height adjuster assembly that can be used to adjust the height of a truck chassis or other part of a vehicle. The height can be adjusted to alter the truck's appearance.

Referring to FIGS. 1A-1D and 2, a pneumatic automotive height adjuster assembly ("assembly 100") according to an exemplary embodiment of the present invention is shown. Two each of assembly 100 are used for each vehicle; one on each side and mirror images of each other. For sake of simplicity, only one assembly 100 will be discussed. Assembly 100 is mounted on a leaf spring 52 of vehicle 50 and engages a frame 54 of a cab on a vehicle 50 to lift frame 54 relative to leaf spring 52.

Figure 2:
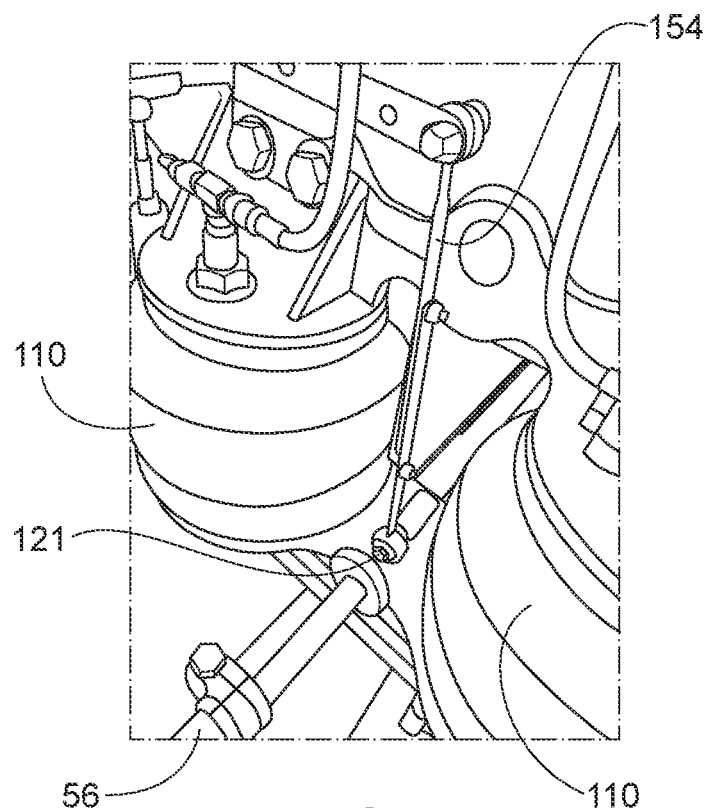
FIG. 2 is another perspective view of the assembly of FIG. 1, showing the mechanical arm on the leveling valve.
Figure 2A:
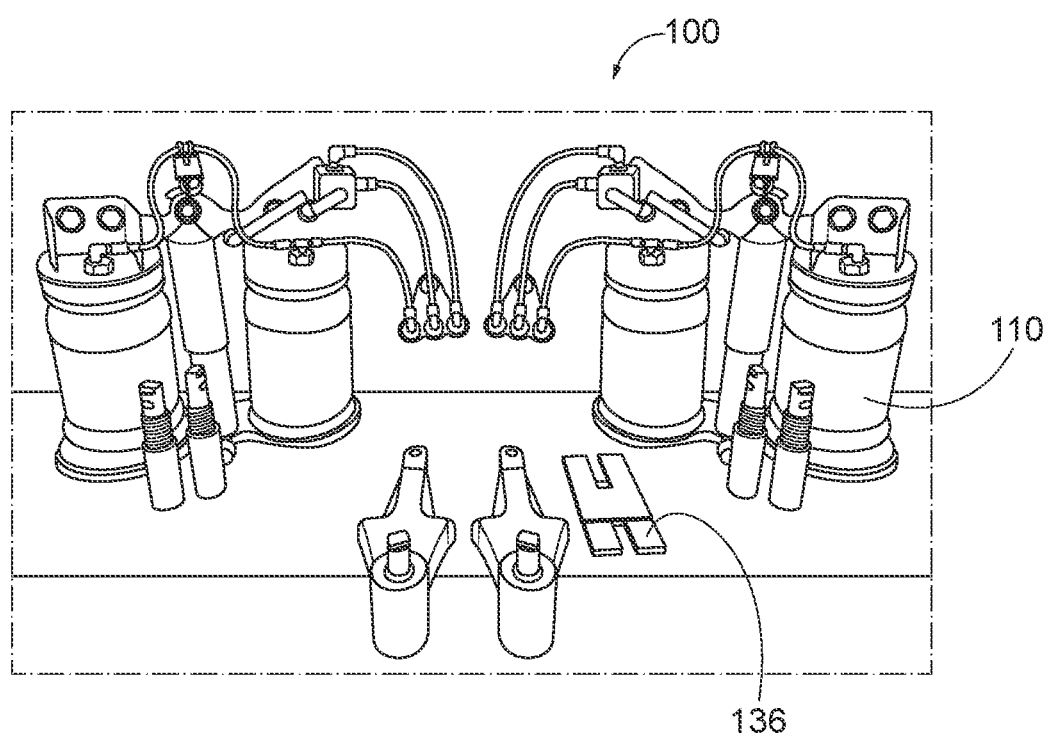
FIG. 2A is a front elevational view of parts of the assembly, showing the shims.

FIG. 2A, shows individual components of system 100 that are described below. Assembly 100 uses bags 110 that are alternately inflated and deflated to raise or lower the frame 54. In an exemplary embodiment, two bags 110 are used. Alternatively, for larger vehicles or heavy haulers, three bags 110 can be used. The use of multiple bags 110 on each side of vehicle 50 provides the option to turn off the air supply to one of the bags 110 for safety reasons. A lower than maximum bag pressure in bags 110 allows for a softer ride with a custom height adaptable using optional shims 136 (shown in FIG. 2A), as will be discussed below.

In an exemplary embodiment, bags can be about 7" diameter, with a collapsible height of about 3.2". A bump stop (not shown) is built into each bag 110 to stop deflation to reduce wear on bags 110. When fully inflated, bags 110 have a height of about 12.25 inches, resulting in a maximum travel of about 9 inches. Each bag 110 has a smaller bottom bellow than a top bellow, allowing the vehicle 50 to be lowered to sit at a lower ride height.

A bottom of each bag 110 includes a lower bolt (not shown) extending therefrom for insertion into lower bag plates 111, 113. Plate 111 supports a rear bag 110 and plate 113 supports a forward bag 110. In an exemplary embodiment, plate 113 is offset relative to plate 111. The offset is about ¾ inch. The offset is required to allow for installation of assembly 100 to provide clearance for engine components without any modification to work on trucks with 32.5" or 34" axle spring center pin locations.

Plates 111, 113 are each mounted on a main base plate 117 that is mounted on leaf spring 52. Plate 111 has a generally circular profile, while plate 113 has a generally rectangular profile. The rectangular profile allows plate 113 to sit on leaf spring 52 over an axle 56 of vehicle 50. Lower bag plates 111, 113 and base plate 117 provide a flat surface to allow air bags 110 to sit lower/straighter at lower ride height with less oblique angle.

A ¾" shock stud 121 is integrated into main base plate 117 and provides for the connection of a lower end 122 of a straight shock absorber 124. Shock absorber 124 is mounted in a vertical position, with a top end 126 of shock absorber 124 fixed to frame 54 via bolt 130.

A steel top plate 118 is located on the top of each bag 110. Plate 118 engages the bottom of frame 54 to raise or lower frame 54. An offset hollow stud 109 extends upwardly from bag 110 and extends through top plate 118 to provide an air connection to bag 110. Top plate 118 includes an upwardly extending flange 119 that bolt onto frame 54.

Optionally, a bag spacer 134 can be provided between top plate 118 and bags 110 to reach a desired ride height without having to change the air pressure inside bags 110. Bag spacer 134 can be 1", 1½", or 2", depending on the model of vehicle 50 on which assembly 100 is being mounted. If bag spacer 134 is used, a shock absorber, longer than shock absorber 124, is used.

Shim 136 can be provided between leaf spring 52 and axle 56 to set caster and camber (as opposed to using air pressure) in bags 110, which allows vehicle 50 to have a set ride height (lower or higher). The use of caster shims 136 gives vehicle 50 a tighter feel and better steering, which results in a much better handling, safer, and easier to drive piece of equipment.

Figure 3:
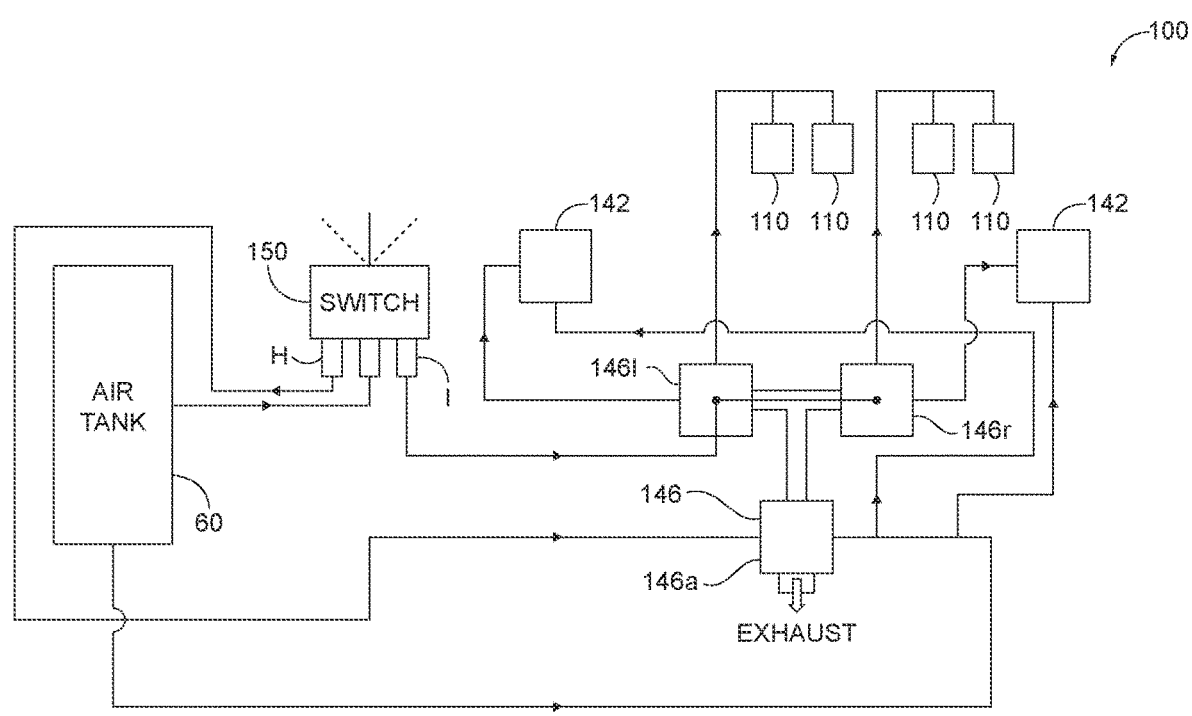
FIG. 3 is a schematic drawing of a pneumatic control system for the assembly of FIG. 1.

Referring to FIG. 3, operation of assembly 100 is controlled by a leveling valve 142 and operated by a pilot valve 146 that are controlled by an air switch 150 located in the cab of vehicle 50. Pilot valve 146 has an inlet 146a that tees to left and right valves 146l, 146r for the left side and right side of vehicle 50, respectively.

Air switch 150 is a three-position switch that allows the vehicle 50 to be raised and lowered in three different conditions (dump, ride (port "I" in FIG. 3), over inflate (port "H" in FIG. 3)) by adjustable rods forming a mechanical arm 154 from leveling valves 142 to main base plate 117 on frame 54 behind the shock absorber 124. In an exemplary embodiment, leveling valve 142 is model no. VS227, manufactured by Hendrickson and pilot valve 146 is model no. 90554615, manufactured by Haldex. The leveling valve 142 sits between shock absorber 124 and frame 54 to allow for additional clearance and safety from components of assembly 100 being hit, bent, or otherwise damaged.

Figure 1C:
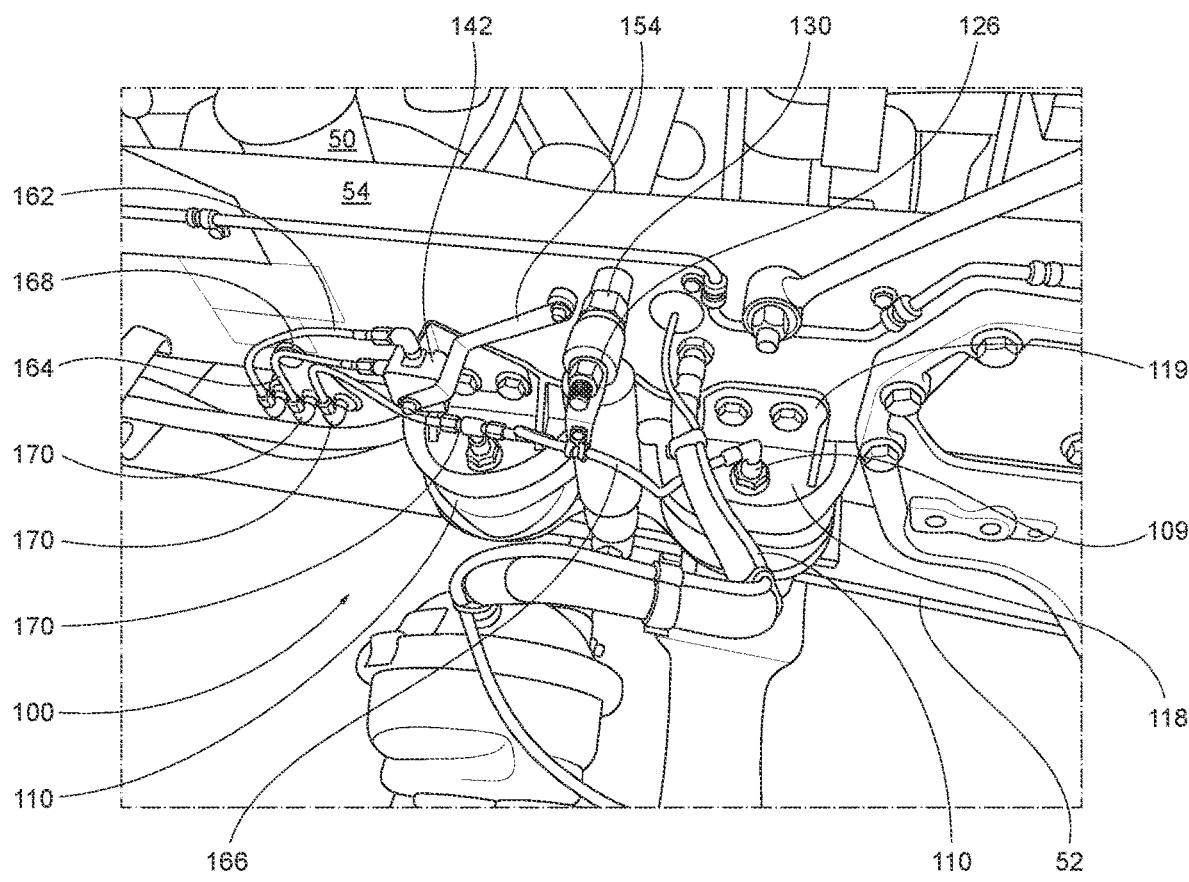
FIG. 1C is another perspective view of the assembly of FIG. 1 with the bags in a deflated condition.
Figure 1D:
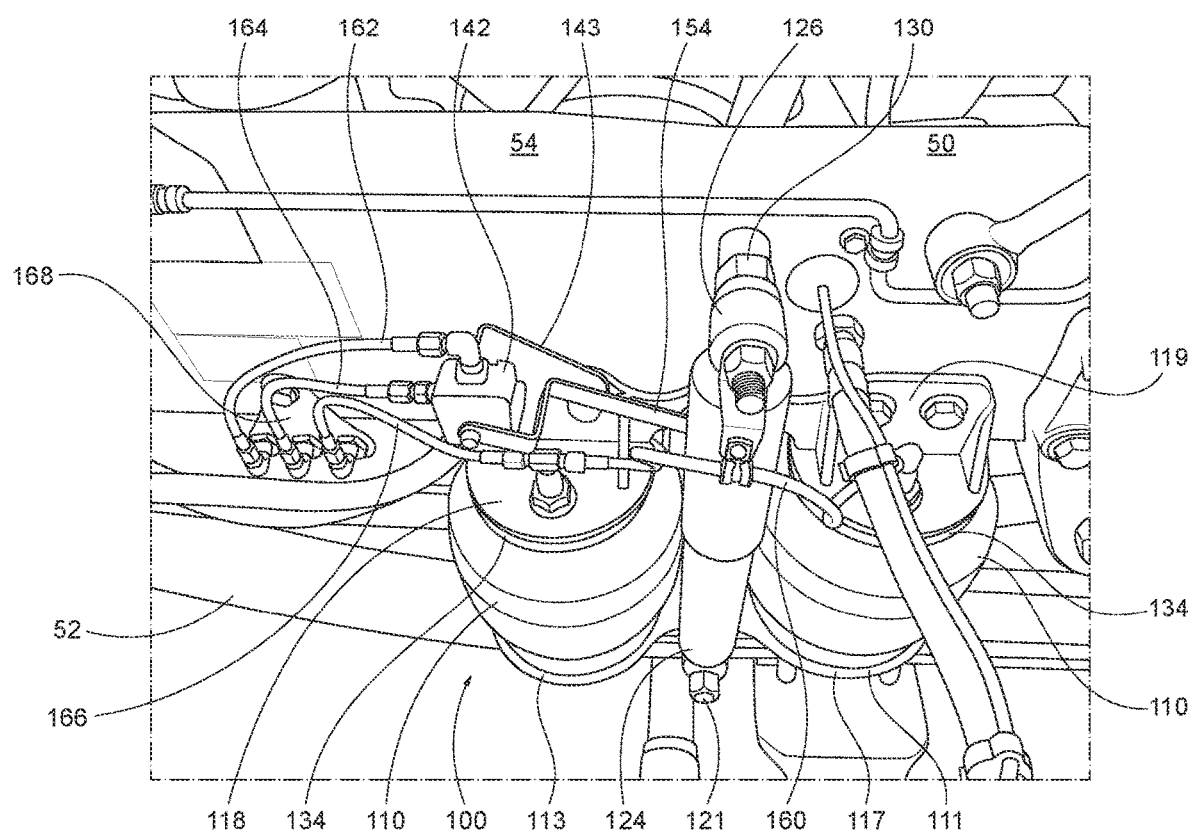
FIG. 1D is another perspective view of the assembly of FIG. 1 with the bags in an inflated condition.

Referring to FIG. 1D, leveling valve 142 is supported by a leveling valve bracket 143 that mounts to a flange 119 on top plate 118. The air switch 150 signals control to the pilot valve 146 to add or subtract air pressure to bags 110 to inflate or deflate bags 110, respectively. When air is added to bags 110, mechanical arm 154 on leveling valve 142 is moved from the position in FIG. 1C to a neutral position in FIG. 1D to close air supply to the bags 110 to maintain a level ride height for vehicle 50.

A pneumatic supply 60, shown schematically in FIG. 3, provides compressed air for distribution to bags 110. Stainless braided lines 160, 162, 164, 166, shown in FIGS. 1C and 1D, are used for the air system, along with ¼" NPT steel fittings (collectively 170) to provide a sturdy air system. An air line bracket 168 is mounted to frame 54 and supports fittings 170 that connect to air lines 162, 164, 166.

Air from pneumatic supply 60 flows through line 164 to leveling valve 142 to provide air to leveling valve 142. Prior to leveling valve 142, air from pneumatic supply tees off to pilot valve 146 to valve 146a. Air flows from leveling valve 142 through line 164 to valve 146r (assuming the right side of vehicle 50) on pilot valve 146 and from valve 146r to bags 110. Switch 150 operates pilot valve 146 to inflate bags 110, deflate bags 110, or override leveling valve 142 to overinflate bags 110 for off-road use.

Assembly 100 can be offered as an add-on kit to enhance a ride by achieving a lower ride height. Assembly 100 can also be provided for self-installation as all clearance issues with different makes/models of vehicles have been worked around with the inventive design (not shown) to operate switch 150 to over-inflate bags 110 to override leveling valve 142 to provide off-road use clearance.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A pneumatic automotive height adjuster assembly comprising:
   at least one bag removably connected to a vehicle having a frame, the at least one bag configured to adjust a height of the frame;
   an air supply line having a supply end and a discharge end, the discharge end being in fluid communication with each of the at least one bag, the air supply line configured to provide air to inflate the at least one bag;
   a switch in fluid communication with the supply end of the air supply line, the switch having a first discharge, a second discharge, and a switch input;
   a leveling valve in fluid communication with the first discharge;
   the air supply line being in fluid communication with the second discharge; and
   an air supply in fluid communication with the leveling valve and the switch input.

2. The assembly according to claim 1, further comprising a bag plate provided under the at least one bag.

3. The assembly according to claim 2, further comprising a leveling arm having a first end connected to the leveling valve and a second end connected to the bag plate.

4. The assembly according to claim 3, wherein the leveling arm is configured to close the leveling valve when the at least one bag inflates to a predetermined amount.

5. The assembly according to claim 1, further comprising at least one shim sized to be located below the bag, the at least one shim configured to set caster and camber in the at least one bag.

6. The assembly according to claim 1, wherein the first discharge provides sufficient air to the at least one bag to inflate the at least one bag a predetermined amount.

7. The assembly according to claim 6, wherein the second discharge provides sufficient air to the at least one air bag to inflate the at least one bag more than the predetermined amount.

8. The assembly according to claim 1, further comprising a pilot valve in fluid communication with the first discharge and with the at least one bag.

9. The assembly according to claim 8, wherein the pilot valve is also in fluid communication with the leveling valve.

10. A pneumatic automotive height adjuster assembly comprising:
    an air supply;
    a switch in fluid communication with the air supply, the switch having:
       an air input;
       a first discharge port; and
       a second discharge port;
    a pilot valve having;
       an input in fluid communication with the first discharge port;
       a first output; and
       a second output;
    a leveling valve in fluid communication with the first output; and
    an airbag in fluid communication with the second output.

11. The assembly according to claim 10, wherein the air supply is in direct fluid communication with the leveling valve.

12. The assembly according to claim 10, wherein the pilot valve comprises an exhaust port.

13. The assembly according to claim 10, wherein the second discharge port is in fluid communication with the pilot valve.

14. The assembly according to claim 10, wherein the airbag comprises a plurality of airbags.

15. The assembly according to claim 10, wherein the pilot valve comprises a left side port and a right side port, wherein the left side port is in fluid communication with the airbag and wherein the right side port is in fluid communication with another airbag.

16. The assembly according to claim 10, further comprising an airbag plate provided under the airbag.

17. The assembly according to claim 16, wherein the leveling valve comprises a leveling arm having a first end connected to the leveling valve and a second end connected to the airbag plate.

18. The assembly according to claim 10, wherein the assembly is configured to adjust a height of a vehicle frame relative to a vehicle spring.

19. The assembly according to claim 10, wherein a bottom portion of the airbag is configured to be mounted on the spring.

20. The assembly according to claim 19, wherein a top portion of the airbag is configured to be attached to the frame.

* * * * *